US011214692B2

(12) United States Patent
Poteet

(10) Patent No.: US 11,214,692 B2
(45) Date of Patent: Jan. 4, 2022

(54) INCREASING ANTI-CORROSION THROUGH NANOCOMPOSITE MATERIALS

(71) Applicant: Hamilton Sundstrand Corporation, Charlotte, NC (US)

(72) Inventor: Steven Poteet, Hamden, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 422 days.

(21) Appl. No.: 15/830,978

(22) Filed: Dec. 4, 2017

(65) Prior Publication Data

US 2019/0169443 A1    Jun. 6, 2019

(51) Int. Cl.
| | | |
|---|---|---|
| C09D 5/08 | (2006.01) | |
| C09D 163/00 | (2006.01) | |
| B05D 7/00 | (2006.01) | |
| B05D 1/02 | (2006.01) | |
| C25D 11/24 | (2006.01) | |
| C25D 11/34 | (2006.01) | |
| C09D 5/00 | (2006.01) | |
| C08K 9/06 | (2006.01) | |
| C08K 3/04 | (2006.01) | |

(52) U.S. Cl.
CPC ............... C09D 5/08 (2013.01); B05D 1/02 (2013.01); B05D 7/54 (2013.01); C09D 5/00 (2013.01); C09D 163/00 (2013.01); C25D 11/246 (2013.01); C25D 11/34 (2013.01); C08K 3/042 (2017.05); C08K 9/06 (2013.01); C08K 2201/011 (2013.01)

(58) Field of Classification Search
CPC .......... C09D 5/08; C09D 5/00; C09D 163/00; B05D 7/54; B05D 1/02; C25D 11/246; C25D 11/34; C08K 2201/011; C08K 9/06; C08K 3/042
See application file for complete search history.

(56) References Cited

U.S. PATENT DOCUMENTS

| | | | |
|---|---|---|---|
| 5,126,074 A | 6/1992 | Bittner | |
| 6,475,621 B1 | 11/2002 | Kohli et al. | |
| 7,691,498 B2 | 4/2010 | Kendig | |
| 8,962,096 B2 | 2/2015 | Ren et al. | |
| 9,228,111 B2 | 1/2016 | Cho et al. | |
| 9,433,975 B2 | 9/2016 | Chakraborty et al. | |
| 9,725,603 B2 | 8/2017 | Virtanen | |
| 9,771,481 B2 | 9/2017 | Lawless et al. | |
| 10,059,595 B1* | 8/2018 | Farbstein | B29C 43/56 |
| 2004/0062873 A1 | 4/2004 | Jung et al. | |
| 2004/0249023 A1 | 12/2004 | Stoffer et al. | |
| 2007/0013588 A1 | 1/2007 | Chen et al. | |
| 2008/0224098 A1 | 9/2008 | Tang et al. | |
| 2010/0144945 A1 | 6/2010 | Nakazawa et al. | |
| 2010/0247922 A1 | 9/2010 | Shah et al. | |
| 2012/0288721 A1* | 11/2012 | Cho | C09J 11/04 428/425.5 |
| 2013/0177769 A1 | 7/2013 | Momma et al. | |
| 2014/0113144 A1 | 4/2014 | Loth et al. | |
| 2014/0151596 A1 | 6/2014 | Hirsch | |
| 2015/0072161 A1 | 3/2015 | Mayo et al. | |
| 2015/0191604 A1 | 7/2015 | Lawless et al. | |
| 2016/0024310 A1 | 1/2016 | McMullin et al. | |
| 2016/0115324 A1 | 4/2016 | Li et al. | |
| 2017/0037257 A1 | 2/2017 | Yang et al. | |
| 2017/0314141 A1* | 11/2017 | Xu | C01B 32/182 |
| 2018/0057696 A1* | 3/2018 | Pourhashem | C09D 5/08 |

FOREIGN PATENT DOCUMENTS

| | | | |
|---|---|---|---|
| CN | 106147505 A | 11/2016 | |
| CN | 106147521 A | 11/2016 | |
| CN | 106349866 A | 1/2017 | |
| CN | 107353773 A | 11/2017 | |
| EP | 1479736 B1 | 11/2004 | |
| WO | WO0185854 A1 | 11/2001 | |
| WO | WO2015090622 A1 | 6/2015 | |
| WO | WO 2015137761 A1 | 9/2015 | |
| WO | WO-2016058466 A1 * | 4/2016 | C01B 32/182 |
| WO | WO2016091059 A1 | 6/2016 | |
| WO | WO2017070883 A1 | 5/2017 | |

OTHER PUBLICATIONS

Extended European Search Report for EP Application No. 18210230.1, dated Apr. 9, 2019, pp. 8.
Database WPI, Week 201581, Thomson Scientific, London, GB; an 2015-71770A XP002781140—& WO2015/174129 A1 (Kansai Paint Co. LTD.) Nov. 19, 2015 *Abstract* *Paragraphs [0014], [0032], [0086], [0087]; claims 1-6.
Database WPI, Week 201672, Thomson Scientific, London, GB; an 2016-456349, XP002781320,—& CN 105733403 A (Shenzhen Shensai'er Co. LTD.) Jul. 6, 2016 *Abstract*.
Database WPI, Week 201714, Thomson Scientific, London, GB; an 2016-687703, XP002781319,—& CN 106047077 A (Univ. Taiyuan Technology) Oct. 26, 2016 *abstract* *paragraphs [0022]-[0034].
Extended European Search Report for EP Application No. 18163164.9, dated Jun. 11, 2018, 10 Pages.
Extended European Search Report for EP Application No. 18163168.0, dated Jun. 11, 2018, 8 Pages.
Strem Chemicals, Inc., Product Blog: Graphene Nanoplatelets with Different Dimensions and Improved Material Electronic Properties, dated Apr. 16, 2016, pp. 2.
Alcotec, "Understanding the Alloys of Aluminum," http://www.alcotec.com/us/en/education/knowledge/techknowledge/understanding-the-alloys-of-aluminum.cfm, Year 2015.
Payback Machine, Understanding the Alloys of Aluminum, Alcotec, Apr. 26, 2015, (Year: 2015).

* cited by examiner

Primary Examiner — Callie E Shosho
Assistant Examiner — Bethany M Miller
(74) Attorney, Agent, or Firm — Kinney & Lange, P.A.

(57) ABSTRACT

A method of increasing corrosion resistance without leveraging toxic hexavalent chromium uses partially oxidized graphene particles mixed into primer applied on metallic alloy surfaces. Graphene is effective as an anti-corrosion primer additive because it acts as a physical barrier and has electrochemical properties that change potentials needed to induce corrosion.

15 Claims, 1 Drawing Sheet

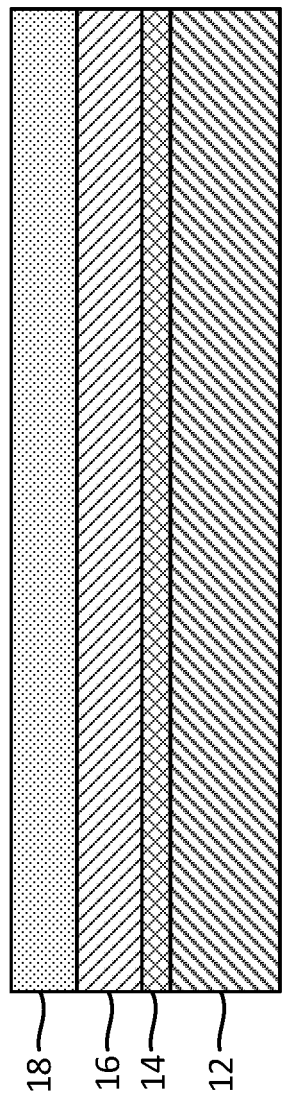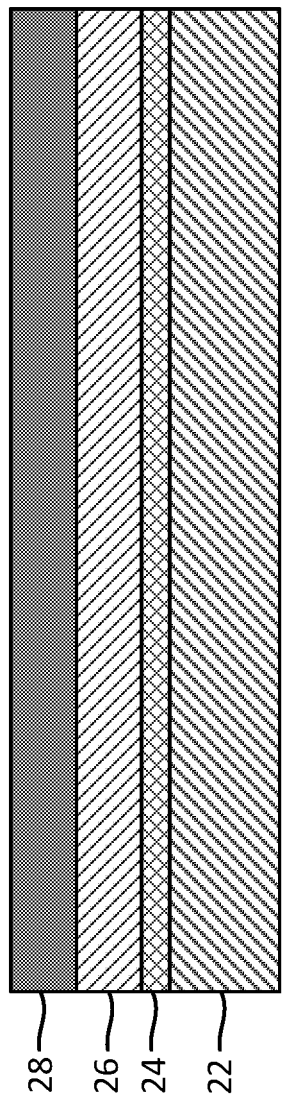

INCREASING ANTI-CORROSION THROUGH NANOCOMPOSITE MATERIALS

BACKGROUND

This application is related generally to anti-corrosion coatings, and specifically to non-chromium anti-corrosion primers.

Chromium based anti-corrosion coatings are used to protect metals such as aluminum, copper, cadmium, zinc, magnesium, tin, silver, iron, and their alloys to reduce and slow corrosion of the metal. Anti-corrosion coatings can be applied to everyday items such as tools or hardware to prevent corrosion, and to aerospace and commercial equipment with high requirements for corrosion durability. Traditionally, chromic acid was used to create these coatings. However, chromic acid contains high levels of hexavalent chromium.

Hexavalent chromium is now known to be a dangerous toxin and a known carcinogen. Chronic inhalation of hexavalent chromium increases risk of lung cancer among other health complications. The presence of hexavalent chromium in drinking water has created substantial health risk as well. For this reason, hexavalent chromium is heavily regulated in both the U.S. and abroad. The EU has banned hexavalent chromium for many applications unless an authorization for a specific application or use has been granted. Thus, industry has been actively trying to find a substitute for hexavalent chromium based conversion coatings and anodizing processes, whereby an active chromated-based epoxy primer is then applied to provide additional protection from corrosion.

Non-chromium based anti-corrosion coatings and primers lack the strength of chromium-based alternatives and allow for quicker corrosion of an underlying metallic substrate. It is well known that chromates possess the unique property of solubilizing and providing active corrosion inhibition at areas that have been depleted (such as scratches or abrasions on coatings). In particular, non-chromium epoxy-based primers found in the art do not provide sufficient protection of damaged coating areas in the absence of a chromated pre-treatment for metallic substrates.

SUMMARY

An anti-corrosion coating composition for a substrate includes an epoxy-based primer comprising non-chromate inhibitors, graphene particles mixed into the epoxy based primer, and alkoxysilanes mixed with the graphene particles.

An article includes a substrate, an anodized layer on the substrate, a sealant, and an anti-corrosion layer attached to the anodizing layer opposite the substrate, the anti-corrosion layer comprising a primer containing partially oxidized graphene functionalized with an alkoxysilane and non-chromate inhibitors.

A method of preventing corrosion includes anodizing a surface of a metallic substrate such that an anodized layer is formed on the metallic substrate, and applying a primer with graphene particles, alkoxysilanes, and non-chromate inhibitors to the anodized layer on the metallic substrate.

BRIEF DESCRIPTION OF THE DRAWINGS

FIG. 1A is a schematic drawing of a substrate with an anti-corrosion coating containing partially oxidized graphene particles.

FIG. 1B is a schematic drawing of a substrate with an anti-corrosion coating with a topcoat.

DETAILED DESCRIPTION

Polymer matrices, such as primers and polyurethanes, used to prevent corrosion, need to eliminate the use of hexavalent chromium due its detrimental environmental effects. An alternative strong corrosion inhibitor is graphene. Graphene has the ability to act as a physical barrier as well as alter the electrochemical properties that may lead to increased anti-corrosion. In particular, oxidized graphene can be used as a corrosion inhibitor in primers.

FIG. 1A is a schematic drawing of a substrate with an anti-corrosion coating containing partially oxidized graphene particles. Article 10 includes substrate 12, anodized layer 14, protection coating 16, and topcoat 18.

Substrate 12 can be metallic or an alloy, including aluminum alloys in the 2000 series, 6000 series and 7000 series, cold-rolled or stainless steels, or zinc-nickel alloys. Substrate 12 is a part that must be protected from corrosion. Substrate 12 is anodized prior to application of protection coating 16, thus, substrate 12 hosts anodized layer 14. Anodized layer 14 is created on an outer surface of substrate 12 through standard anodizing methods, such as application of an acid such as sulfuric acid or phosphoric acid followed by a sealing process. Typically, anodizing layer 14 leverages a trivalent chromium sealant. Alternatively, anodized layer 14 may instead be a conversion coating, such as a chromate or trivalent chromium conversion coating; for instance, a standard Alodine® 600 conversion coating could be used.

Protection coating 16 is an epoxy-based primer containing one or more non-chromate corrosion inhibitors mixed with a nanomaterial filler. The non-chromate corrosion inhibitor can be praseodymium, manganese, silane, aluminum, zinc, or a rare earth metal depending on the anti-corrosion needs.

The nanomaterial filler in protection coating 16 is partially oxidized graphene. The graphene particles can be, for example, graphene nanoplatelets, and have average diameters between 1 and 25 nanometers. When dispersed in solution, the partially oxidized graphene is exfoliated to an average thickness of one to a four layers. The partially oxidized graphene is made in coating 16 by combining with a combatable functionalizing agent, such as organo-functionalized alkoxysilanes, into a graphene suspension.

The functionalization of oxygen units on the graphene allows for positive interaction of the graphene suspension with the epoxy-based primer, allowing better adhesion and a homogenous mixture. The oxygen units on the partially oxidized graphene platelets allow functionalization by the hydrolyzed alkoxy units of the silanes, while a terminal functional unit of the silane reacts with the epoxy based primer. This provides enhanced strength to the epoxy by promoting covalent bonding. Additionally, unbound silane condenses and binds to anodized layer 14 to form an additional barrier layer. Excess silanes in the suspension help anti-corrosion through self-healing when the silanes hydrolyze and form hydrosiloxanes.

Partially oxidized graphene has the ability to act as a physical barrier to prevent corrosion. These partially oxidized graphene particles are two dimensional nanomaterials that act as sheet barriers within protection coating 16. The larger surface areas of the partially oxidized graphene particles help protect substrate 12 from moisture, gases and ions that could corrode the surface of substrate 12. Interactions of partially oxidized graphene with trivalent chromium (present from the anodizing sealant in anodizing layer 14) can lead to increased anti-corrosion compared to other corrosion prohibitors.

Moreover, partially oxidized graphene provide electrical conductivity, which may affect the potentials needed to induce corrosion. These properties create additional corrosion resistance for substrate 12, and particularly guard against scribe damage. Specifically, partially oxidized graphene can sequester corrosion inhibitors near a site of substrate exposure to the environment, slowing corrosion at that site. For instance, in a 2,000 hour ASTM B117 corrosion test on substrates treated with between 0.1 wt % and 1.25 wt % partially oxidized graphene particle samples, visible scribe protection was seen in solutions with at least 0.5 wt % graphene. Partially oxidized graphene suspensions were successful with up to 15% oxygen content and an organo-functionalized alkoxysilane.

Additionally, graphene can adsorb trivalent chromium from the anodizing sealant to form a uniform $Cr_2O_3$ layer. Additionally, silane-functionalize graphene, assisted by the local environment, may oxidize the trivalent chromium from the the anodizing sealant into hexavalent chromium in situ in protection coating 16. This self-healing chromium oxide film on the surface of substrate 12 continues to prevent corrosion and prevents degradation over time of the primer. Testing of a primer filled with 0.5 wt % to 1.0 wt % partially oxidized graphene showed self-healing properties not seen in the same primer without the nanofiller materials.

Graphene has also shown the ability to increase hydrophobicity of a substrate, further protecting from corrosion. Partially oxidized graphene solutions of between 0.5% and 1.0% increased the contact angle of water on the surface of the substrate by 23 to 31 degrees, lowering the surface energy and preventing moisture from coming into contact with the metallic substrate. Overall, if moisture and oxygen permeability kinetics are slowed through protection coating 16, the lifetime of non-chromated substrate 12 increases.

Protection coating 16 is prepared by mixing the partially oxidized graphene into the epoxy-based primer as the primer is compiled from its components. A primer mix typically contains a base component, a catalyst component, and a thinner component. For example, this mixture can be a solvent, pre-polymers that will make a BPA (bisphenol-A-(epichlorhydrin)), rheological modifiers, and pigments. First, graphene is dispersed in the thinner (i.e. water) through sonication at 20-40 kHz. Next, an alkoxysilane mixture is prepared in a 95:5 alcohol/water mixture, where the alcohol is generally methanol, ethanol, or isopropanol, whereby the mixture is subsequently added to the graphene dispersion and stirred between 30-60° C. for one to two hours. Next, the base and catalyst components of the primer are added to the resulting solution. Subsequently, the mixture is high shear mixed at 3000-5000 RPM until homogeneous. The primer layer is then applied to anodized layer 14 of metallic substrate 12 by spraying a layer of the primer mixture between 0.0005 inch and 0.002 inch thick.

Topcoat 18 is a polyurethane based layer which can act as a sealant, gloss, or UV protectant among other things. Topcoat 18 in FIG. 1A is applied on top of protection coating 16 opposite substrate 12 for both extra protection and aesthetic appeal.

FIG. 1B is a schematic drawing of an article 20 including anti-corrosion coating 26 on a substrate 22. Article 20 includes substrate 22, anodized layer 24, protection coating 26, and filled topcoat 28. Substrate 22, anodized layer 24, and protection coating 26 are similar to their counterparts in FIG. 1A. They are made and compiled in the same way as described in reference to FIG. 1A.

Topcoat 28 is similar to topcoat 18 of FIG. 1A, but topcoat 28 contains partially oxidized graphene that provides additional anti-corrosion to substrate 22. Dispersion of partially oxidized graphene into topcoat 28 is similar to the process used to mix partially oxidized graphene into the primer of protection coating 26. First, the graphene particles are dispersed in either an organic thinner (such as a thinner containing xylenes, ethylbenzenes, or similar), or an organic solvent (such as toluene, n-methyl-2-pyrrolidone, or similar). The partially oxidized graphene is sonicated at 20-40 kHz for 5-20 minutes into the thinner or solvent. Next, an alkoxysilane mixture is prepared in a 95:5 alcohol to water mixture, where the alcohol is generally methanol, ethanol, or isopropanol, whereby the mixture is subsequently added to the graphene dispersion and stirred between 30-60° C. for 1 to 2 hours. Next, the resulting solution is blended into a base component of the topcoat via high shear mixing at 3000-8000 RPM until homogenous. Subsequently, the activator component (a catalyst) is added as required.

Topcoat 28 allows for further anti-corrosion, similar to protection layer 26. The use of partially oxidized graphene in topcoat 28 allows for a physical barrier of nanomaterials, sequestering of non-chromate corrosion inhibitors, and increased hydrophobicity. In a test of a topcoat filled with partially oxidized graphene exposed to 1,500 hours of salt spray, a topcoat with 10 wt % graphene solution sufficiently protected a scribed portion of a metallic substrate.

Additionally, a topcoat filled with partially oxidized graphene allows for less degradation of the topcoat's barrier properties over time. Testing of a topcoat filled with 0.5 wt % to 1.0 wt % partially oxidized graphene showed the barrier properties of the filled topcoat were an order of magnitude better than topcoats without graphene.

The use of partially oxidized graphene in epoxy-based primers with non-chromate corrosion inhibitors to increase corrosion resistance and protect against scribe damage allows a transition away from hexavalent-chromium method of anti-corrosion. The use of partially oxidized graphene in non-chromate primers is also lightweight and cost-effective. This additionally allows the transition to non-chromate anti-corrosion while using low process conditions such as sonication and high shear mixing to effectively exfoliate the nanomaterials. The use of organosilanes in coordination with partially oxidized graphene allows for self-healing of the primer upon damage to a localized region.

Discussion of Possible Embodiments

The following are non-exclusive descriptions of possible embodiments of the present invention.

An anti-corrosion coating composition for a substrate includes an epoxy-based primer comprising non-chromate inhibitors, graphene particles mixed into the epoxy based primer, and alkoxysilanes mixed with the graphene particles.

The composition of the preceding paragraph can optionally include, additionally and/or alternatively, any one or more of the following features, configurations and/or additional components:

The graphene particles are between 0.10% and 1.25% by weight of the epoxy-based primer.

The alkoxysilanes functionalize up to 15% oxygen by weight of the graphene nanoplatelets in the epoxy-based primer. The graphene particles are nanoplatelets.

The nanoplatelets have average diameters between 1 nanometer and 25 nanometers.

The primer is comprised of a base component, a catalyst component, and a thinner.

An article includes a substrate, an anodized layer on the substrate, a sealant, and an anti-corrosion layer attached to the anodizing layer opposite the substrate, the anti-corrosion layer comprising a primer containing partially oxidized graphene functionalized with an alkoxysilane and non-chromate inhibitors.

The article of the preceding paragraph can optionally include, additionally and/or alternatively, any one or more of the following features, configurations and/or additional components:

The substrate is selected from the group consisting of aluminum, steel, zinc, nickel, and alloys thereof.

The partially oxidized graphene contains at least 5% oxygen by weight.

The partially oxidized graphene contains at least 10% oxygen by weight.

The partially oxidized graphene contains at least 15% oxygen by weight.

The partially oxidized graphene contains at least 20% oxygen by weight.

The partially oxidized graphene contains at least 25% oxygen by weight.

The article includes a topcoat attached to the primer opposite the anodizing layer.

The topcoat comprises graphene particles.

A method of preventing corrosion includes anodizing a surface of a metallic substrate such that an anodized layer is formed on the metallic substrate, and applying a primer with graphene particles, alkoxysilanes, and non-chromate inhibitors to the anodized layer on the metallic substrate.

The method of the preceding paragraph can optionally include, additionally and/or alternatively, any one or more of the following features, configurations and/or additional components:

The method includes applying a topcoat to the primer opposite the metallic substrate.

The primer is prepared by dispersing graphene particles in water to create a dispersion, functionalizing the graphene particles by adding alkoxysilanes to the dispersion, adding an epoxy primer base component to the dispersion, mixing the dispersion such that the dispersion is homogenous, and mixing a primer catalyst in the dispersion.

Oxidizing the graphene particles results in up to 15% by weight oxygen in the dispersion.

Applying the primer comprises spraying a layer of primer between 0.0005 inches and 0.002 inches thick.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An epoxy-based primer for an anti-corrosion coating composition for a substrate comprising:
   non-chromate inhibitors, wherein non-chromate inhibitors comprise praseodymium, manganese, aluminum, a rare earth metal, or combinations thereof;
   partially oxidized graphene particles mixed into the epoxy-based primer, wherein the partially oxidized graphene particles are nanoplatelets having average diameters between 1 nanometer and 25 nanometers, wherein the partially oxidized graphene particles contain at least 5% oxygen by weight, and wherein the partially oxidized graphene particles are between 0.50% and 1.00% by weight of the epoxy-based primer; and
   alkoxysilanes mixed with the partially oxidized graphene particles to form a suspension, wherein a portion of the alkoxysilanes are hydrolyzed to include hydrolyzed alkoxy units that functionalize oxygen units on the partially oxidized graphene particles and terminal functional units of the portion of alkoxysilanes react with the epoxy-based primer by promoting covalent bonding and wherein excess alkoxysilanes remain in the suspension.

2. The epoxy-based primer of claim 1, wherein the partially oxidized graphene particles contain at least 5% by weight and up to 15% oxygen by weight.

3. The epoxy-based primer of claim 1, wherein the epoxy-based primer further comprises a base component, a catalyst component, and a thinner.

4. An article comprises:
   a substrate;
   an anodized layer on the substrate;
   a sealant, wherein the sealant comprises trivalent chromium; and
   an anti-corrosion layer attached to the anodizing layer opposite the substrate, the anti-corrosion layer comprising an epoxy-based primer containing partially oxidized graphene particles functionalized with an alkoxysilane and non-chromate inhibitors, wherein the partially oxidized graphene particles are nanoplatelets having average diameters between 1 nanometer and 25 nanometers, wherein the partially oxidized graphene particles contain at least 5% oxygen by weight, wherein the partially oxidized graphene particles are between 0.50% and 1.00% by weight of the epoxy-based primer, wherein the partially oxidized graphene particles form a uniform $Cr_2O_3$ layer from trivalent chromium in the sealant, wherein non-chromate inhibitors comprise praseodymium, manganese, silane, aluminum, zinc, a rare earth metal, or combinations thereof, wherein the alkoxysilanes are mixed with the partially oxidized graphene particles to form a suspension, and wherein a portion of the alkoxysilanes are hydrolyzed to include hydrolyzed alkoxy units that functionalize oxygen units on the partially oxidized graphene particles and terminal functional units of the portion of alkoxysilanes react with the epoxy-based primer by promoting covalent bonding, wherein unreacted alkoxysilanes condense and bind to the anodized layer to form an additional barrier layer, and wherein excess alkoxysilanes remain in the suspension.

5. The article of claim 4, wherein the substrate is selected from the group consisting of aluminum, steel, zinc, nickel, and alloys thereof.

6. The article of claim 4, wherein the partially oxidized graphene particles contains at least 10% oxygen by weight.

7. The article of claim 6, wherein the partially oxidized graphene particles contains at least 15% oxygen by weight.

8. The article of claim 7, wherein the partially oxidized graphene particles contain at least 20% oxygen by weight.

9. The article of claim 8, wherein the partially oxidized graphene particles contain at least 25% oxygen by weight.

10. The article of claim 4, further comprising a topcoat attached to the epoxy-based primer opposite the anodizing layer.

11. The article of claim 10, wherein the topcoat comprises partially oxidized graphene particles.

12. A method of preventing corrosion comprises:
anodizing a surface of a metallic substrate such that an anodized layer is formed on the metallic substrate;
applying a sealant to the anodized layer, wherein the sealant comprises trivalent chromium; and
applying an epoxy-based primer with partially oxidized graphene particles, alkoxysilanes, and non-chromate inhibitors to the sealant on the anodized layer on the metallic substrate, wherein the partially oxidized graphene particles are nanoplatelets having average diameters between 1 nanometer and 25 nanometers, wherein the partially oxidized graphene particles contain at least 5% oxygen by weight, wherein the partially oxidized graphene particles are between 0.50% and 1.00% by weight of the epoxy-based primer, wherein the partially oxidized graphene particles form a uniform $Cr_2O_3$ layer from trivalent chromium in the sealant, wherein non-chromate inhibitors comprise praseodymium, manganese, silane, aluminum, zinc, a rare earth metal, or combinations thereof, wherein the alkoxysilanes are mixed with the partially oxidized graphene particles to form a suspension, wherein a portion of the alkoxysilanes are hydrolyzed to include hydrolyzed alkoxy units that functionalize oxygen units on the partially oxidized graphene particles and terminal functional units of the portion of alkoxysilanes react with the epoxy-based primer by promoting covalent bonding, wherein unreacted alkoxysilanes condense and bind to the anodized layer to form an additional barrier layer, and wherein excess alkoxysilanes remain in the suspension.

13. The method of claim 12, further comprising applying a topcoat to the epoxy-based primer opposite the metallic substrate.

14. The method of claim 12, wherein the epoxy-based primer is prepared by:
dispersing the partially oxidized graphene particles in water to create a dispersion;
functionalizing the partially oxidized graphene particles by adding the alkoxysilanes to the dispersion;
adding an epoxy primer base component to the dispersion;
mixing the dispersion such that the dispersion is homogenous; and
mixing a primer catalyst in the dispersion.

15. The method of claim 12, wherein applying the epoxy-based primer comprises spraying a layer of the epoxy-based primer between 0.0005 inches and 0.002 inches thick.

* * * * *